(12) United States Patent
Matsuoka et al.

(10) Patent No.: US 9,714,052 B2
(45) Date of Patent: Jul. 25, 2017

(54) REAR VEHICLE-BODY STRUCTURE OF AUTOMOTIVE VEHICLE

(71) Applicant: MAZDA MOTOR CORPORATION, Hiroshima (JP)

(72) Inventors: Hidenori Matsuoka, Hiroshima (JP); Ken Yamada, Hatsukaichi (JP); Akiyoshi Masuda, Aki-gun (JP); Kouji Matsushita, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 15 days.

(21) Appl. No.: 14/941,123

(22) Filed: Nov. 13, 2015

(65) Prior Publication Data

US 2016/0159400 A1 Jun. 9, 2016

(30) Foreign Application Priority Data

Dec. 5, 2014 (JP) ................................. 2014-246522

(51) Int. Cl.
*B62D 21/15* (2006.01)
*B62D 25/08* (2006.01)

(52) U.S. Cl.
CPC ........... *B62D 21/152* (2013.01); *B62D 25/08* (2013.01); *B62D 25/087* (2013.01)

(58) Field of Classification Search
CPC ..... B62D 21/152; B62D 25/087; B62D 25/08
USPC ........................................ 296/187.11, 203.04
See application file for complete search history.

(56) References Cited

U.S. PATENT DOCUMENTS 5,110,177 A * 5/1992 Akio ....................... B62D 21/11
  280/784
5,195,780 A * 3/1993 Inoue ....................... B60K 15/03
  280/830

FOREIGN PATENT DOCUMENTS

JP     S55-147971 U    10/1980
JP     2013-233898 A   11/2013

* cited by examiner

*Primary Examiner* — Glenn Dayoan
*Assistant Examiner* — Dana Ivey
(74) *Attorney, Agent, or Firm* — Studebaker & Brackett PC

(57) ABSTRACT

A pair of rear side frames respectively comprise front bending-promotion portions, middle bending-promotion portions and rear bending-promotion portions which cause the rear side frames to bend inward, in a vehicle width direction, in a trough-folding shape in a rear collision of a vehicle, and a longitudinal distance L2 between the front bending-promotion portions and the middle bending-promotion portions is set to be longer than a longitudinal direction L1 between the middle bending-promotion portions and the rear bending-promotion portions. Thereby, there is provided a rear vehicle-body structure of an automotive vehicle which can properly absorb a collision load at a vehicle-body rear portion, even if a rear side frame is made from material which may not cause smooth bucking of the rear side frame.

6 Claims, 11 Drawing Sheets

REAR VEHICLE-BODY STRUCTURE OF AUTOMOTIVE VEHICLE

BACKGROUND OF THE INVENTION

The present invention relates to a rear vehicle-body structure of an automotive vehicle which comprises a rear floor panel and a pair of right-and-left rear side frames extending in a vehicle longitudinal direction and connected to both side portions, in a vehicle width direction, of the rear floor panel.

Generally, a pair of right-and-left rear side frames which extend in a vehicle longitudinal direction are provided at a rear vehicle-body portion of an automotive vehicle for the purpose of ensuring the vehicle-body rigidity.

In recent years, reducing of the weight and thickness of the rear side frame has been attained by using a high-tensile steel plate, so that the bucking performance of the rear side frame deteriorates because of the thin plate-thickness and also breaking of the rear side frame or peeling of a welding portion improperly occur because of the high tension. Consequently, it has become difficult to control load-absorption and deformation of the rear side frame.

Meanwhile, in a torsion-beam axle type of rear suspension in which no sub frame is provided below a rear floor panel, the rear side frame cannot be supported by the sub frame, so that the rear side frame is configured in a cantilever manner such that it extends rearward from the vicinity of a floor kick-up portion at a central side of a vehicle body. Accordingly, it is difficult to stabilize buckling deformation of the rear side frame. It is basically desired that the above-described rear side frame can surely absorb a collision load by its being bent (folded) at plural points in order from its rear-end side, being supported firmly at its base-end side (a central side in a vehicle longitudinal direction).

Japanese Patent Laid-Open Publication No. 2013-233898 discloses a structure in which a pair of right-and-left rear side frames extending in the vehicle longitudinal direction are provided below a rear floor panel and beads are alternately formed at both sides of the rear side frame which are spaced apart from each other in the longitudinal direction. Herein, the beads can be points to cause bucking of the rear side frame when a collision load is inputted to the right-and-left rear side frames from a rear bumper beam in a vehicle rear collision.

The above-described patent document, however, does not disclose nor remotely suggest anything about a longitudinal distance between the above-described beads as a bending-promotion portion.

Meanwhile, Japanese Utility-Model Laid-Open Publication No. S55-147971 discloses a structure in which a vertical bead extending in parallel to an axial direction of a frame is formed at a rear end portion of the frame and a lateral bead extending perpendicularly to the axial direction of the frame is formed at a front portion of the frame.

However, this patent document does not disclose nor remotely suggest anything about forming of plural lateral beads and a longitudinal distance between the plural lateral beads.

SUMMARY OF THE INVENTION

An object of the present invention is to provide a rear vehicle-body structure of an automotive vehicle which can properly absorb the collision load at the vehicle-body rear portion, even if the rear side frame is made from material which may not cause smooth bucking of the rear side frame.

The present invention is a rear vehicle-body structure of an automotive vehicle, comprising a rear floor panel, and a pair of right-and-left rear side frames extending in a vehicle longitudinal direction and connected to both side portions, in a vehicle width direction, of the rear floor panel, wherein the rear side frame comprises a front bending-promotion portion, a middle bending-promotion portion, and a rear bending-promotion portion which cause the rear side frame to bend inward, in the vehicle width direction, in a trough-folding shape in a rear collision of the vehicle, and a longitudinal distance between the front bending-promotion portion and the middle bending-promotion portion is set to be longer than that between the middle bending-promotion portion and the rear bending-promotion portion.

According to the present invention, since there are provided three points of bending-promotion portions to cause the rear side frame to bend inward, in the vehicle width direction, in the trough-folding shape and the longitudinal distance between the front and middle bending-promotion portions is set to be longer than that between the middle and rear bending-promotion portions, when the vehicle rear collision occurs, a rear part of the rear side frame can be compactly bent (folded) from the rear, thereby generating load absorption deformation of the rear side frame, and a middle part of the rear side frame can be greatly bent (folded) inward, in the vehicle width direction, with a support point at the front bending-promotion portion, thereby generating load absorption deformation of the rear floor panel. Thereby, even if the rear side frame is made from material which may not cause smooth bucking of the rear side frame (such as high-tensile steel plate, FRP, or magnesium alloy), the collision load can be properly absorbed at a vehicle-body rear portion.

In an embodiment of the present invention, the rear side frame is formed by pattern-drawing press in a U shape so as to have a pair of right-and-left side walls and a bottom wall, a pair of reinforcing beads extending in an axial direction of the rear side frame are formed at respective intermediate parts of the rear side frame between the front bending-promotion portion and the middle bending-promotion portion and between the middle bending-promotion portion and the rear bending-promotion portion, and each of the pair of reinforcing beads comprises an upper vertical wall positioned outside a base face of the side wall of the rear side frame, a lateral wall extending toward an inside of the rear side frame from a lower end of the upper vertical wall, and a lower vertical wall extending downward from an inside end of the lateral wall and positioned inside the base face of the side wall of the rear side frame, whereby the reinforcing bead is configured in a roughly S shape in a cross section perpendicular to the axial direction of the rear side frame.

According to this embodiment, since the above-described roughly S-shaped reinforcing beads are used, smooth drawing of a press die can be ensured and the rigidity of the rear side frame can be improved by an increase of ridgelines. Accordingly, even if the rear side frame is made from the material which may not have excellent formability, any bending deformation of the rear side frame at another point than the above-described bending-promotion portions can be prevented properly.

In another embodiment of the present invention, the rear side frame is formed by a member for load absorption deformation provided at a vehicle rear-end side and a member for fixation provided at a vehicle central side which are connected to each other, and the reinforcing bead is provided at least one of side walls, in the vehicle width direction, of a portion of the member for load absorption deformation which is positioned near a connection part thereof, the reinforcing bead having a taper-shaped tip.

According to this embodiment, since the reinforcing bead has the taper-shaped tip, stress concentration on a rigidity changing point where the member for load absorption deformation and the member for fixation are connected can be properly reduced, so that a bending (folding) mode of the rear side frame can be stabilized.

In another embodiment of the present invention, an auxiliary device is provided on an outward side, in the vehicle width direction, of the rear side frame, and the middle bending-promotion portion is provided such that the rear side frame bends inward, in the vehicle width direction, at a portion thereof which is poisoned near the auxiliary device. Herein, the auxiliary device may be a fuel feeding pipe, for example.

According to this embodiment, since the rear side frame bends inward, in the vehicle width direction, in the vehicle rear collision and deformation of a front part of the rear side frame is suppressed, it can be surely prevented that the auxiliary device is improperly caught by the bending rear side frame.

Other features, aspects, and advantages of the present invention will become apparent from the following description which refers to the accompanying drawings.

DETAILED DESCRIPTION OF THE INVENTION

Figure 1:
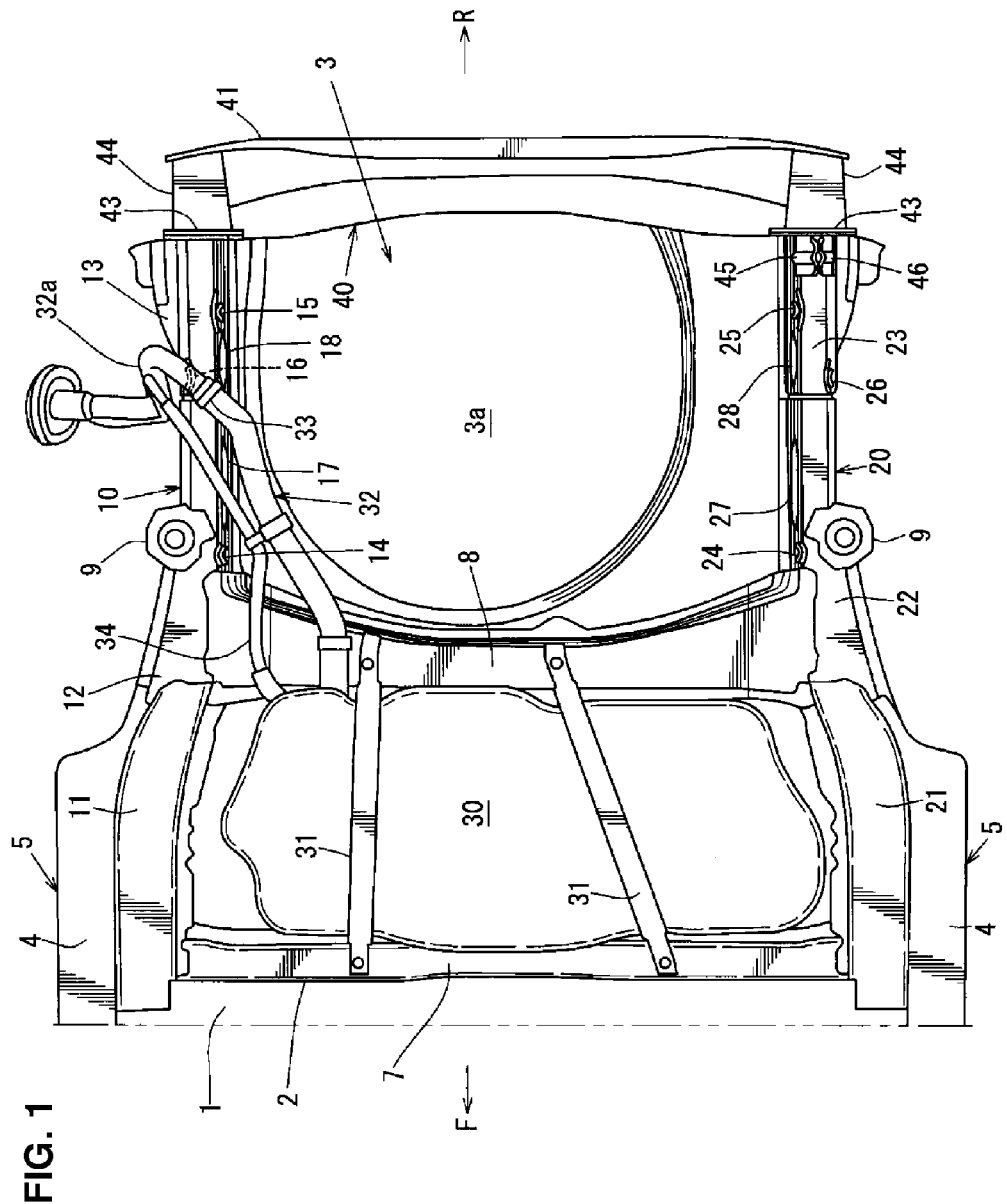
FIG. 1 is a bottom view showing a rear vehicle-body structure of an automotive vehicle of the present invention.
Figure 3:
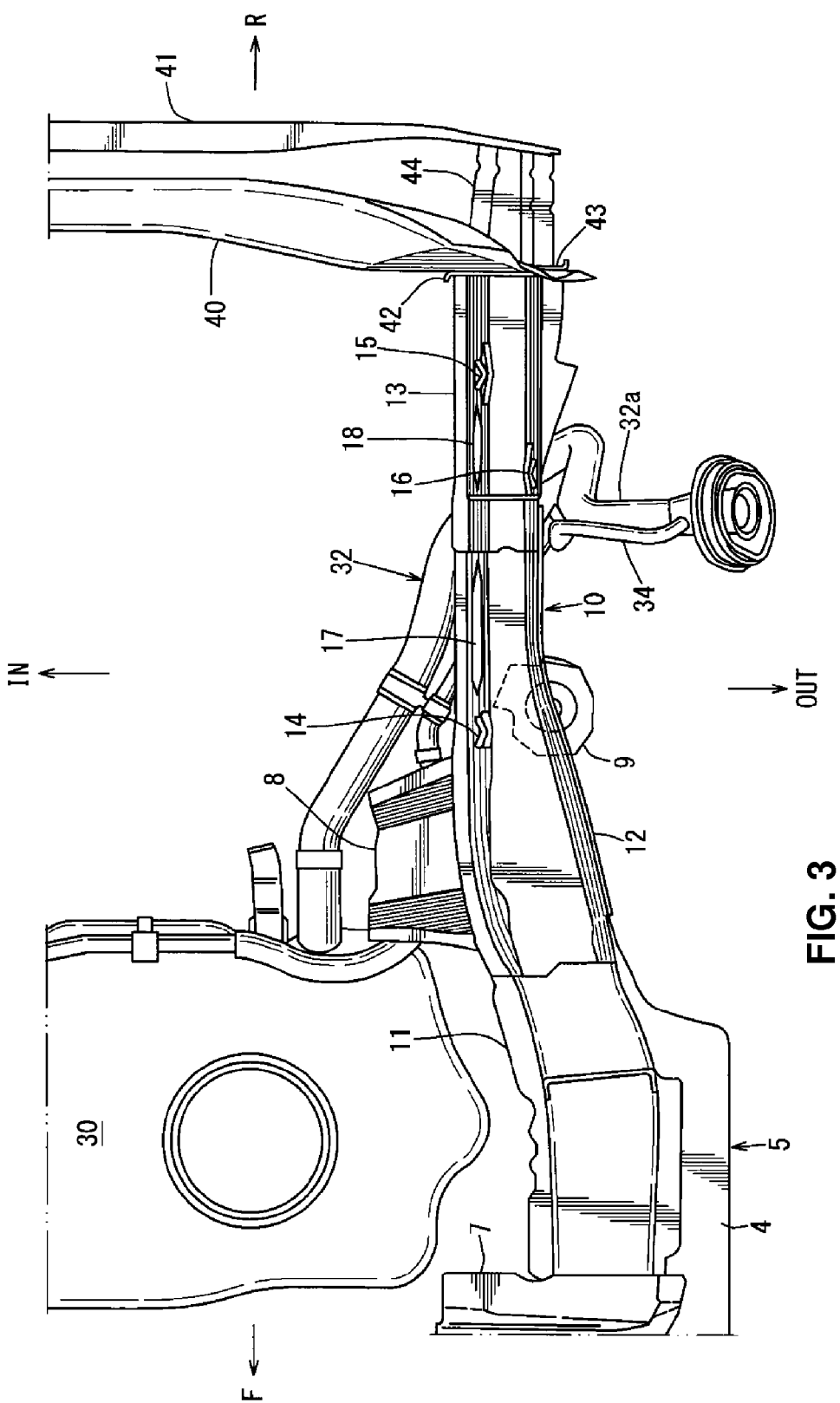
FIG. 3 is a plan view showing a major part of a left side of the rear vehicle-body structure of the automotive vehicle.
Figure 4:
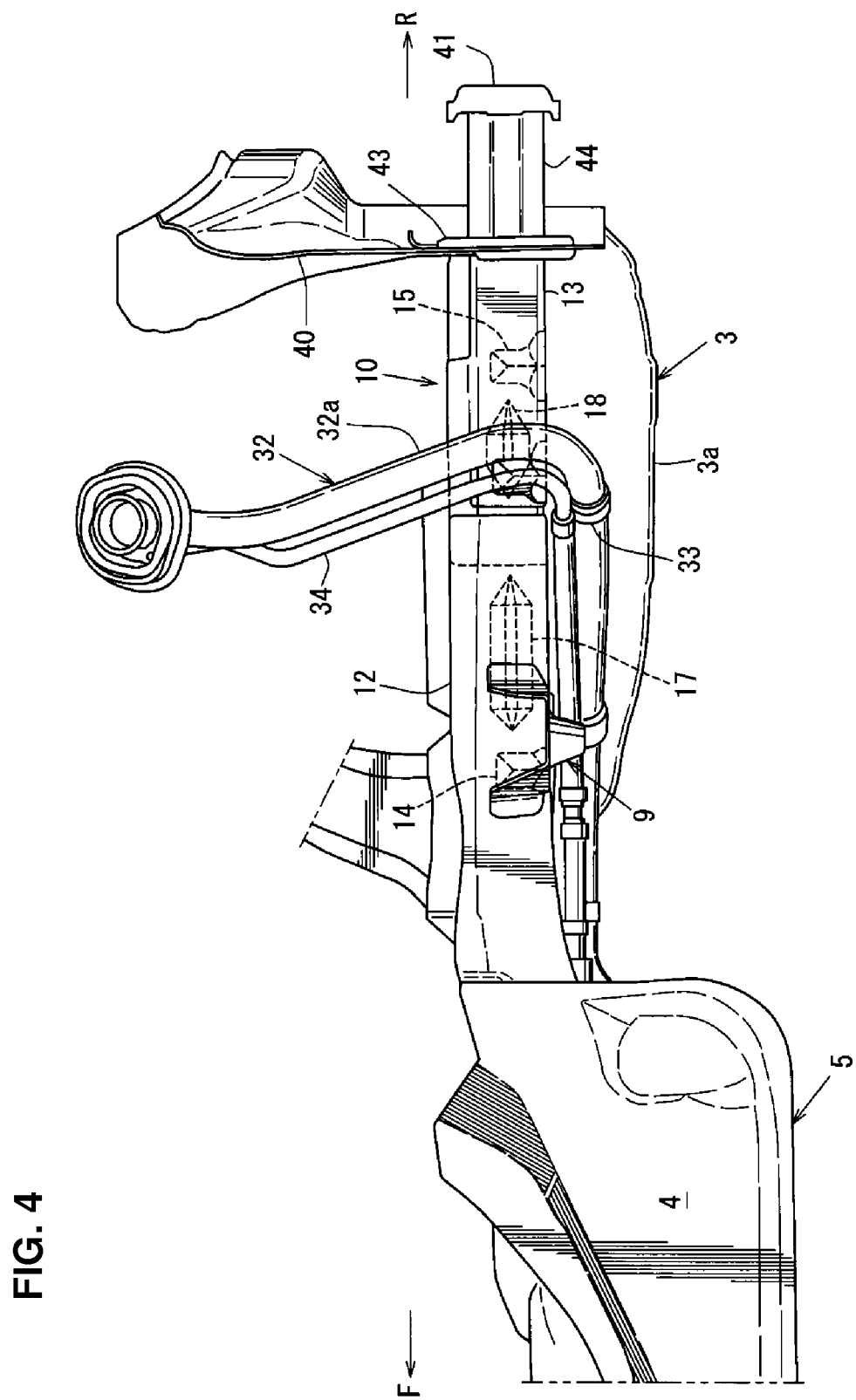
FIG. 4 is a side view of FIG. 3.

Hereafter, an embodiment of the present invention will be described referring to the drawings. The drawings show a rear vehicle-body structure of an automotive vehicle. FIG. 1 is a bottom view showing a rear vehicle-body structure of an automotive vehicle of the present invention, FIG. 2 is a bottom view showing a state in which a fuel tank, a fuel feeding pipe, and a breather pipe are removed from the structure shown in FIG. 1, FIG. 3 is a plan view showing a major part of a left side of the rear vehicle-body structure of the automotive vehicle, and FIG. 4 is a side view of FIG. 3.

Figure 2:
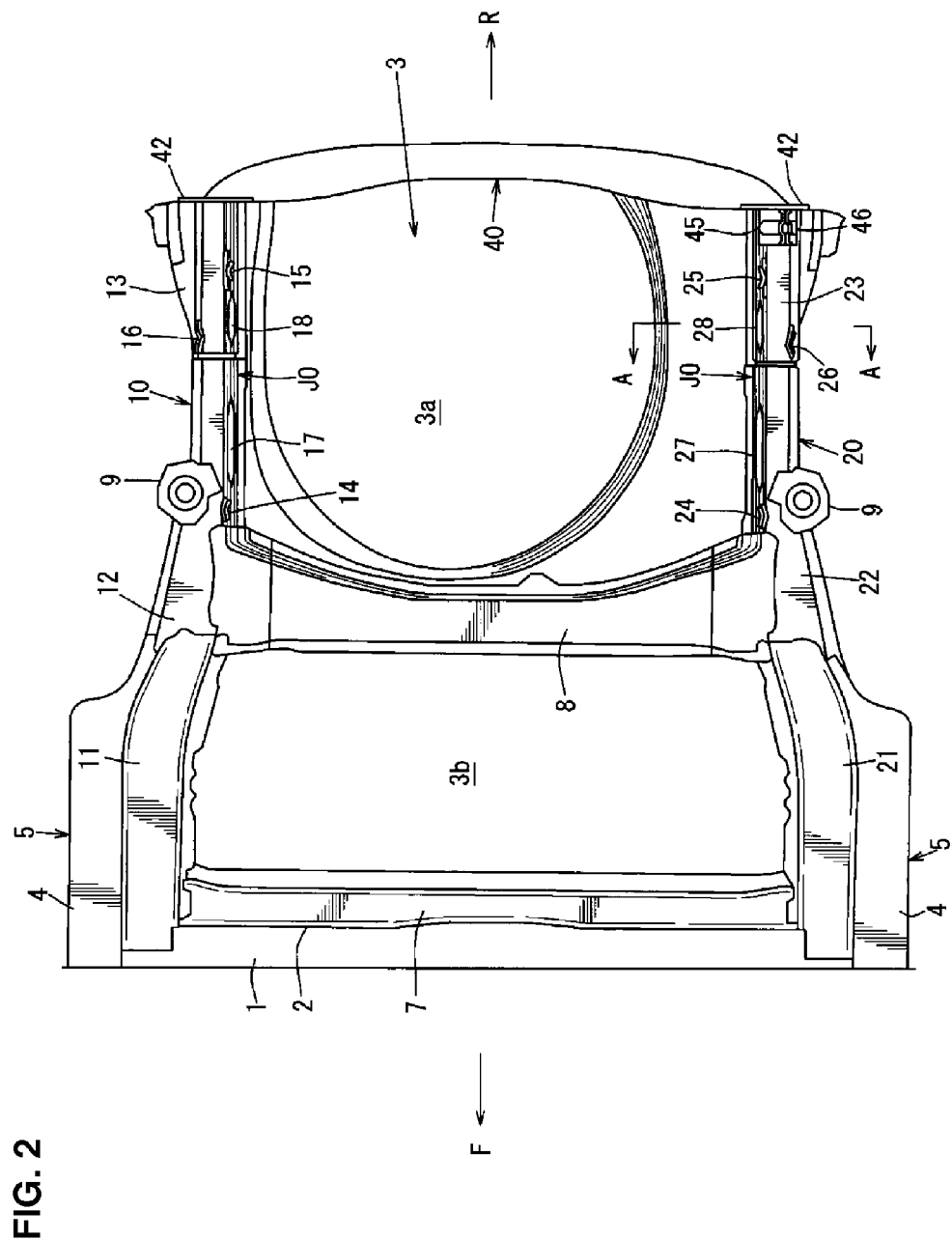
FIG. 2 is a bottom view showing a state in which a fuel tank, a fuel feeding pipe, and a breather pipe are removed from the structure shown in FIG. 1.

In FIGS. 1 and 2, a floor panel 1 which forms a floor face of a vehicle compartment is provided, and a rear floor panel 3 is continuously and integrally provided behind the floor panel 1 via a kick-up portion 2 which rises upward. A recess portion 3a which also serves as a spare tire pan is formed at a central position, in a vehicle width direction, of a rear part of the rear floor panel 3. A pair of side sills 5, each of which comprises a side sill inner 4 and a side sill outer, are connected to right-and-left both sides of the floor panel 1. The side sill 5 is a vehicle-body reinforcing member which has a side-sill closed cross section extending in a longitudinal direction of the vehicle.

As shown in FIGS. 1 and 2, a left-side rear side frame 10 which comprises three split members of a front member 11, a middle member 12, and a rear member 13 is provided at a left side of a lower portion of the rear floor panel 3. This rear side frame 10 is configured to have a U-shaped or hat-shaped cross section. Between the rear side frame 10 and the rear floor panel 3 is formed a rear-side closed cross section which extends in the vehicle longitudinal direction.

Likewise, as shown in FIGS. 1 and 2, a right-side rear side frame 20 which comprises three split members of a front member 21, a middle member 22, and a rear member 23 is provided at a right side of a lower portion of the rear floor panel 3. This rear side frame 20 is configured to have a U-shaped or hat-shaped cross section. Between the rear side frame 20 and the rear floor panel 3 is formed another rear-side closed cross section which extends in the vehicle longitudinal direction.

As shown in FIGS. 1 and 2, behind the above-described kick-up portion 2 is provided a cross member 7 (a so-called No. 3 cross member) which connects the right-and-left side sills 5, 5 (specifically, the side sill inners) in the vehicle width direction via respective front portions of the right-and-left front members 11, 21. Between the cross member 7 and a front part of the rear floor panel 3 is formed a closed cross section which extends in the vehicle width direction.

A cross member 8 (a so-called No. 4 cross member) which connects the right-and-left rear side fames 10, 20 in the vehicle width direction is provided between respective front portions of the right-and-left middle members 12, 22. Between the cross member 8 and a central part, in the vehicle longitudinal direction, of the rear floor panel 3 is formed another closed cross section which extends in the vehicle width direction.

As shown in FIG. 1, a fuel tank 30 is arranged between the above-described cross members 7, 8 below the rear floor panel 3 (specifically, below a rear seat pan 3b shown in FIG. 2).

Further, as shown in FIG. 1, this fuel tank 30 is supported at a vehicle body by using a pair of right-and-left tank bands 31, 31. A filler box is formed at a rear fender panel (not illustrated) provided on the left side of the vehicle, and this filler box and the fuel tank 30 are coupled by a fuel feeding pipe 32 (a so-called fuel pipe) as an auxiliary device.

This fuel feeding pipe 32 is supported by the vehicle body at plural points. A front part of the fuel feeding pipe 32 which is positioned in front of a hose clip 33 shown in FIG. 1 is made from rubber for the purpose of allowing forward move of the fuel feeding pipe 32 in a vehicle rear collision. Further, a breather pipe 34 to release air inside the fuel tank 30 during fuel feeding is provided at the fuel tank 30. This breather pipe 34 is provided to extend roughly along the fuel feeding pipe 32 up to a position of an upper end of the fuel feeding pipe 32.

As shown in FIG. 1, the fuel feeding pipe 32 is arranged such that it extends rearward from an inlet port of the fuel tank 30 and then rises upward toward the filler box from right behind the hose clip 33 on an outward side, in the vehicle width direction, of the left-side rear side frame 10. That is, the rear vehicle-body structure of the present embodiment comprises the pair of right-and-left rear side frames 10, 20 extending in the vehicle longitudinal direction and the fuel feeding pipe 32 (see a rising portion 32a shown in FIG. 1, in particular) as the auxiliary device arranged close to the rear side frame 10 which is one of the pair of right-and-left rear side frames 10, 20 extending in the vehicle longitudinal direction. Herein, the rear side frames 10, 20 are the auxiliary-device side rear side frame 10 positioned on the side of the auxiliary device (the fuel feeding pipe 32) and the opposite-side rear side frame 20 positioned on an opposite side to the auxiliary-device side rear side frame 10.

As shown in FIGS. 1 and 2, the above-described rear side frames 10, 20 are interconnected, on their rear-end side, by a rear end panel 40 and a rear bumper reinforcement 41 which are connecting members extending in the vehicle width direction.

That is, a pair of set plates 42 are attached to respective rear end portions of the rear side frames 10, 20 as shown in FIG. 2, and the above-described rear bumper reinforcement 41 is attached to these set plates 42 via a pair of attaching plates 43 and a pair of crash cans 44 shown in FIG. 1.

Meanwhile, as shown in FIGS. 1 and 2, an inner member 45 and an outer member 46 which attach a tie-down hook are attached to a rear end portion of the right-side rear side frame 20 positioned on the opposite side to the auxiliary device. Herein, in FIGS. 1 and 2, reference character 9 denotes a spring upper seat which forms a part of a rear suspension.

Figure 5:
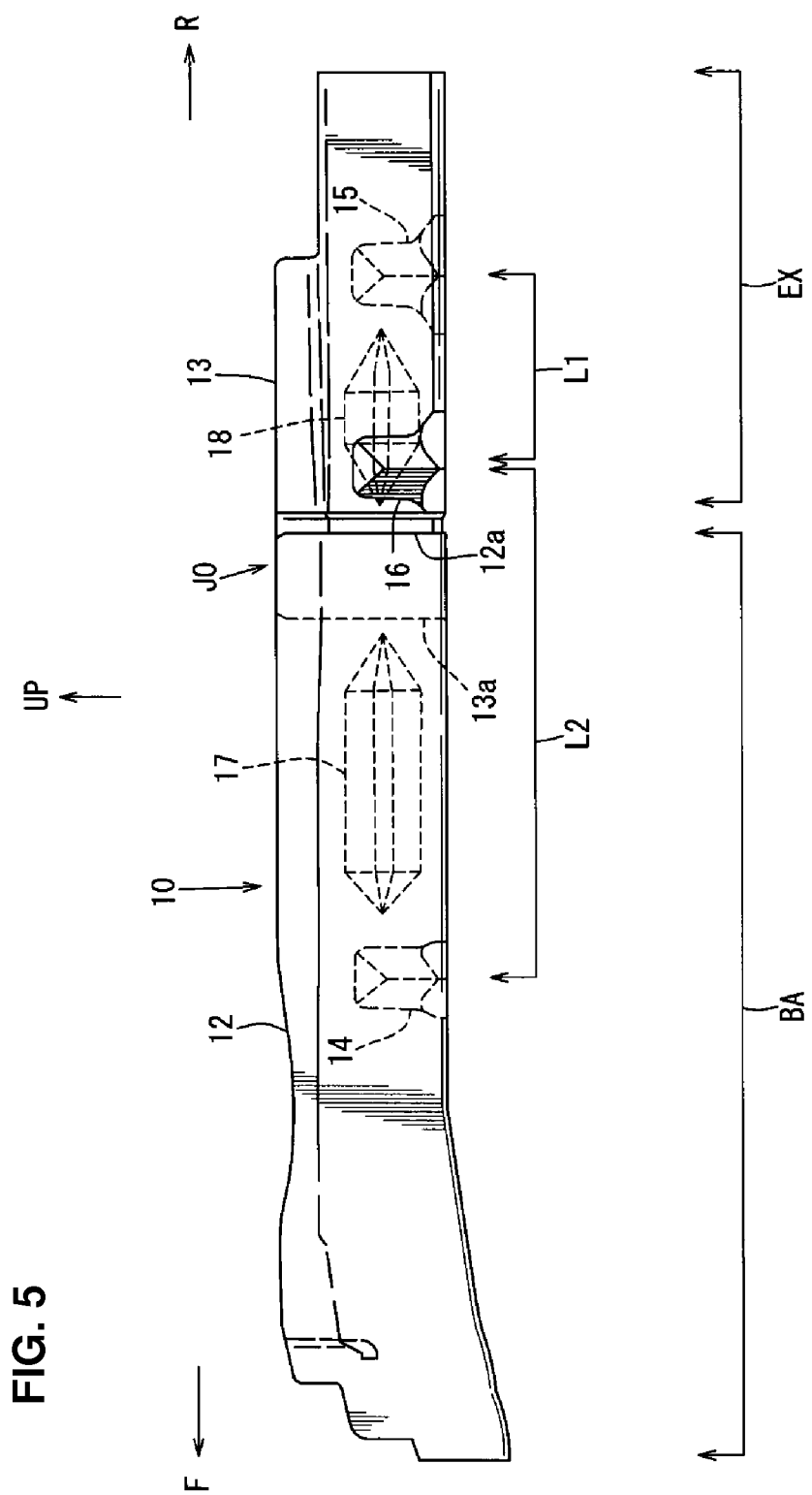
FIG. 5 is a side view of a left-side rear side frame, when viewed from an outward side, in a vehicle width direction.
Figure 6:
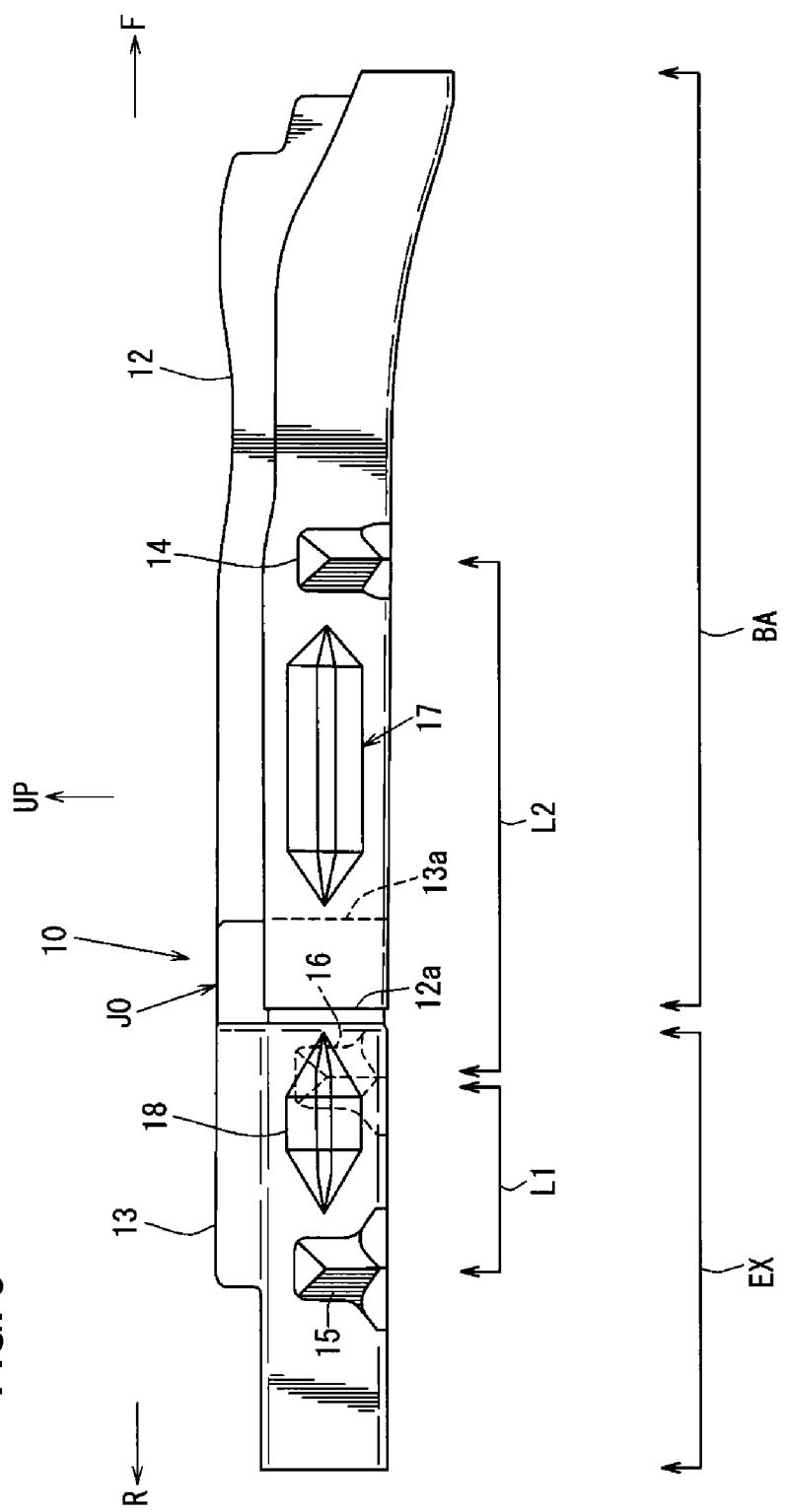
FIG. 6 is a side view of the left-side rear side frame, when viewed from an inward side, in the vehicle width direction.

FIG. 3 is a plan view showing a major part of a left side of the rear vehicle-body structure of the automotive vehicle, FIG. 4 is a side view of FIG. 3, FIG. 5 is a side view of the left-side rear side frame 10, when viewed from the outward side in the vehicle width direction, and FIG. 6 is a side view of the left-side rear side frame 10, when viewed from the inward side in the vehicle width direction.

As shown in FIGS. 5 and 6, the left-side rear side frame 10 comprises a base portion BA which is comprised of the middle member 12 as a member for fixation positioned on the central side of the vehicle and an extension portion EX which is comprised of the rear member 13 as a member for load absorption deformation positioned on the rear-end side of the vehicle. The extension portion EX is connected to the base portion BA and extends rearward from the base portion BA. The right-side rear side frame 20 is the same as the left-side one 10 in this regard.

As shown in FIG. 2, the above-described rear side frames 10, 20 are frames extending in the vehicle longitudinal direction roughly horizontally, and a front bending promotion portion 14 and a rear bending promotion portion 15 are formed at the left-side rear side frame 10. Specifically, the front bending promotion portion 14 is formed at a position corresponding to the spring upper seat 9 which is located at a base-end side of the rear side frame 10, and the rear bending promotion portion 15 is formed at a rear-end side of the rear side frame 10 where a vehicle rear-collision load is inputted. These bending promotion portions 14, 15 are formed at one side, in the vehicle width direction, (i.e., inward side) of the rear side frame 10 as shown in FIGS. 2 and 5. Additionally, between the above-described bending promotion portions 14, 15 is formed a middle bending promotion portion 16 at the other side, in the vehicle width direction, (i.e., outward side) of the rear side frame 10.

In the present embodiment, the front bending promotion portion 14 is formed at the middle member 12, and the rear bending promotion portion 15 and the middle bending promotion portion 16 are formed at the rear member 13. These bending promotion portions 14, 15, 16 extend in a vertical direction over a length which is greater than a half of the height of the rear side frame 10 and are formed in a bead shape such that they are concaved toward the inside of the rear-side closed cross section, respectively.

The right-side rear side frame 20 is configured similarly to the above-described left-side rear side frame 10 as shown in FIG. 2. That is, a front bending promotion portion 24 is formed at a position corresponding to the spring upper seat 9 which is located at a base-end side of the rear side frame 20, and a rear bending promotion portion 25 is formed at a rear-end side of the rear side frame 20 where the vehicle rear-collision load is inputted. These bending promotion portions 24, 25 are formed at one side, in the vehicle width direction, (i.e., inward side) of the rear side frame 20. Between the above-described bending promotion portions 24, 25 is formed a middle bending promotion portion 26 at the other side, in the vehicle width direction, (i.e., outward side) of the rear side frame 20.

In the present embodiment, the front bending promotion portion 24 is formed at the middle member 22, and the rear bending promotion portion 25 and the middle bending promotion portion 26 are formed at the rear member 23. These bending promotion portions 24, 25, 26 extend in the vertical direction over a length which is greater than a half of the height of the rear side frame 20 and are formed in a bead shape such that they are concaved toward the inside of the rear-side closed cross section, respectively.

In other words, the rear side frames 10, 20 respectively comprise the front bending-promotion portions 14, 24, the middle bending-promotion portions 16, 26, and the rear bending-promotion portions 15, 25 which cause these rear side frames to bend inward, in the vehicle width direction, in a trough-folding shape in a rear collision of the vehicle.

Further, as shown in FIGS. 2 and 5, a longitudinal distance L2 between the front bending-promotion portions 14, 24 and the middle bending-promotion portions 16, 26 is set to be longer than a longitudinal distance L1 between the middle bending-promotion portions 16, 26 and the rear bending-promotion portions 15, 25 (L2>L1).

That is, the present rear vehicle-body structure is configured such that since there are provided three points of bending-promotion portions 14, 15, 16, 24, 25, 26 to cause the rear side frames 10, 20 to bend inward, in the vehicle width direction, in the trough-folding shape and the longitudinal distance L2 between the front and middle bending-promotion portions 14, 24, 16, 26 is set to be longer than that L1 between the middle and rear bending-promotion portions 16, 26, 15, 25 (L2>L1), when the vehicle rear collision occurs, each rear part of the rear side frames 10, 20 can be compactly bent (folded) from the rear, thereby generating load absorption deformation of the rear side frames, and each middle part of the rear side frames 10, 20 can be greatly bent (folded) inward, in the vehicle width direction, with a support point at each of the front bending-promotion portions 14, 24, thereby generating load absorption deformation of the rear floor panel 3.

Thereby, the present rear vehicle-body structure is configured such that even if the rear side frames 10, 20 are made from material which may not cause smooth bucking of the rear side frame (such as high-tensile steel plate, FRP, or magnesium alloy), the collision load can be properly absorbed at a vehicle-body rear portion.

As shown in FIGS. 2 and 5, at respective joint portions JO of the middle members 12, 22 and the rear members 13, 23 of the rear side frames 10, 20 is formed a rigidity changing point positioned at both positions of the rear end 12a (the left-side rear side frame 10 is illustrated only in FIG. 5) of the middle members 12, 22 and the front end 13a (the left-side rear side frame 10 is illustrated only in FIG. 5) of the rear members 13, 23.

Reinforcing beads 17, 27 which extend in the longitudinal direction are formed at respective inward-side portions, in the vehicle width direction, of intermediate parts of the rear side frames 10, 20 between the front end 13a of the rear members 13, 23 and the front bending-promotion portions 14, 24 for the purpose of improving the proof stress of the rear side frames 10, 20. Further, reinforcing beads 18, 28 which extend in the longitudinal direction are formed at respective inward-side portions, in the vehicle width direction, of intermediate parts of the rear side frames 10, 20 between the rear end 12a of the middle members 12, 22 and the rear bending-promotion portions 15, 25 for the purpose of improving the proof stress of the rear side frames 10, 20.

The reinforcing beads 18, 28 among the above-described reinforcing beads 17, 18, 27, 28 are the ones which are provided at respective inward-side portions, in the vehicle width direction, of parts of the rear members 13, 23 forming the member for load absorption deformation (the extension portion EX) near the joint portions JO.

The respective reinforcing beads 17, 18, 27, 28 have the same structure, and the reinforcing bead 28, one of those beads, will be described referring to FIG. 7 which is a sectional view taken along line A-A of FIG. 2.

Figure 7:
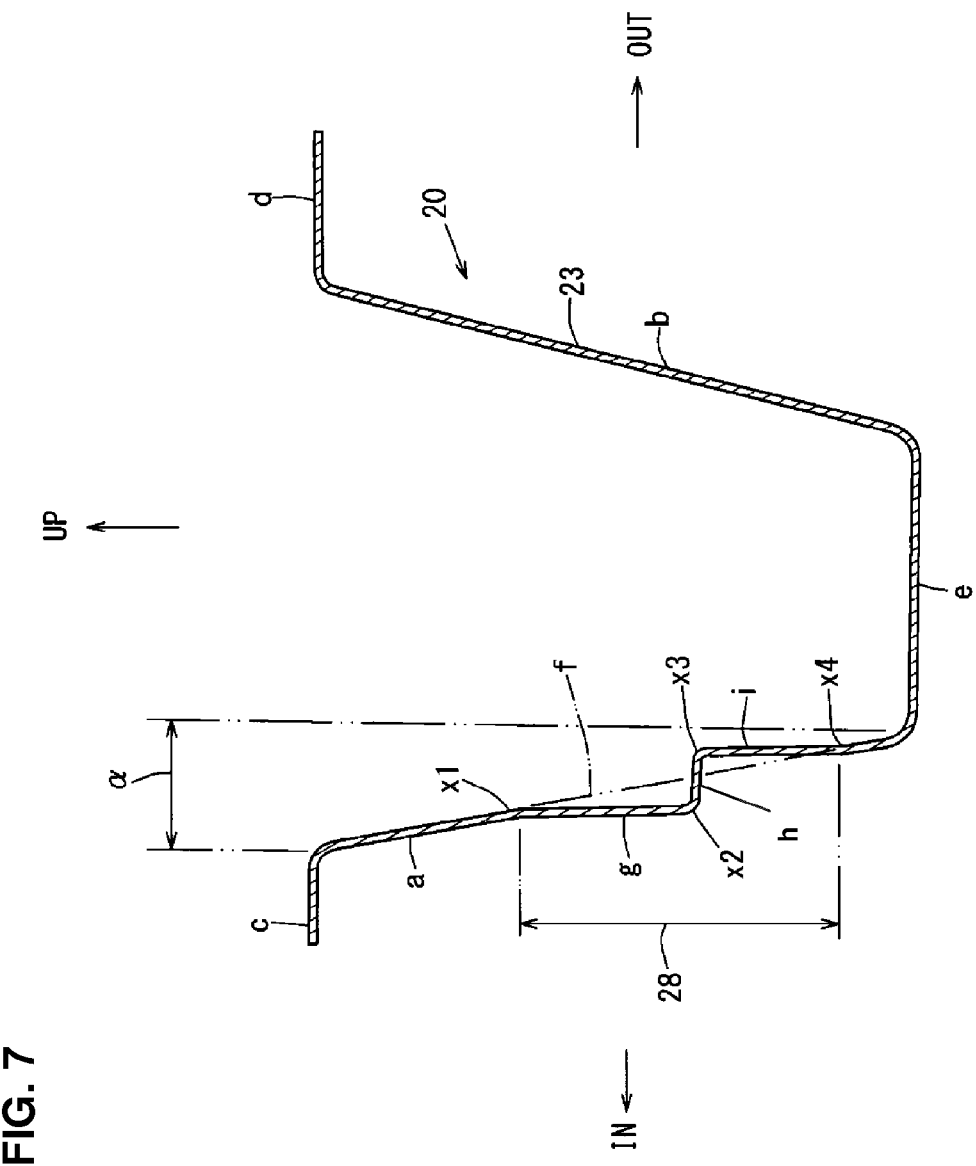
FIG. 7 is a sectional view of a right-side rear side frame taken along line A-A of FIG. 2.

As shown in FIG. 7, the rear side frame 20 is formed by pattern-drawing press in a hat shape, including a U shape, so as to have a pair of right-and-left side walls a, b.

That is, the rear side frame 20 comprises a flange portion c which extends inward from an upper end of the left side wall a, a flange portion d which extends outward from an upper end of the right side wall b, and a bottom wall e which interconnects respective lower ends of the both side walls a, b.

The above-described reinforcing bead 28 is configured in a roughly S shape in a cross section such that it protrudes in inward-and-outward both directions (a lateral direction in the figure) which are perpendicular to a drawing direction of press forming (a vertical direction in the figure) relative to a base face f of the left side wall a positioned on the inward side, in the vehicle width direction, of the rear side frame 20 in a range a of a plan-view projecting plane.

Specifically, the reinforcing bead 28 comprises an upper vertical wall g which extends downward from a ridgeline X1 of an intermediate part, in the vehicle direction, of the side wall a and is positioned outside the base face f of the side wall a of the rear side frame 20, a lateral wall h which extends toward an inside of the close cross section of the rear side frame 20 from a ridgeline X2 at a lower end of the upper vertical wall g, and a lower vertical wall i which extends downward from a ridgeline X3 at an inside end of the lateral wall h and is positioned inside the base face f of the side wall a of the rear side frame 20, whereby the reinforcing bead 28 is configured in the roughly S shape in the cross section.

By using the reinforcing bead 28 configured in the roughly S shape in the cross section, smooth drawing of a press die can be ensured and the rigidity of the rear side frame 20 can be improved with an increase of the ridgelines X2, X3. Accordingly, even if the rear side frame 20 is made from the material (such as high-tensile steel plate, FRP, or magnesium alloy) which may not have excellent formability, any bending deformation of the rear side frame 20 at another point than the above-described bending-promotion portion can be properly prevented.

The other reinforcing beads 17, 18, 27 are configured in the roughly S shape in the cross section similarly to the above-described reinforcing bead 28. Further, the reinforcing beads 17, 18, 27, 28 are configured, as shown in FIGS. 2, 5 and 6, such that each of those has a taper-shaped tip at its front end and its rear end, so that stress concentration on the vicinity of the joint portions JO as a rigidity changing point can be properly reduced, thereby stabilizing a bending (folding) mode of the rear side frames 10, 20.

Specifically, the above-described rear side frames 10, 20 comprise the rear members 13, 23 as the member for load absorption deformation positioned on the vehicle's rear-end side and the middle members 12, 22 as the member for fixation positioned on the vehicle's central side which are connected to each other, and each of the above-described reinforcing beads 18, 28 is provided at least one of side walls, in the vehicle width direction, of the portion of the member for load absorption deformation which is positioned near the joint portion JO thereof, the reinforcing beads 18, 28 having the taper-shaped tip. Herein, since the reinforcing beads 18, 28 are configured to have the taper-shaped tips, the stress concentration on the vicinity of the joint portions JO as the rigidity changing points, which are formed by the connection of the rear members 13, 23 of the member for load absorption deformation and the middle members 12, 22 as the member for fixation, is so reduced that the bending (folding) mode of the rear side frames 10, 20 can be stabilized properly.

As shown in FIGS. 1, 3 and 4, the rising portion 32a of the fuel feeding pipe 32 as the auxiliary device is provided on the outward side, in the vehicle width direction, of the left rear side frame 10, and the above-described middle bending promotion portion 16 is provided so as to cause the left rear side frame 10 bend inward, in the vehicle width direction, in the trough-folding shape in the rear collision of the vehicle.

The rear side frame 10 bends inward, in the vehicle width direction, in the vehicle rear collision and deformation of a front part of the rear side frame 10 is suppressed, so that it can be surely prevented that the fuel feeding pipe 32 (the rising portion 32a, in particular) as the auxiliary device is improperly caught by the bending rear side frame 10. In the figures, an arrow F shows a vehicle forward direction, an arrow R shows a vehicle rearward direction, an arrow IN shows a vehicle inward direction, an arrow OUT shows a vehicle outward direction, and an arrow UP shows a vehicle upward direction.

Figure 8:
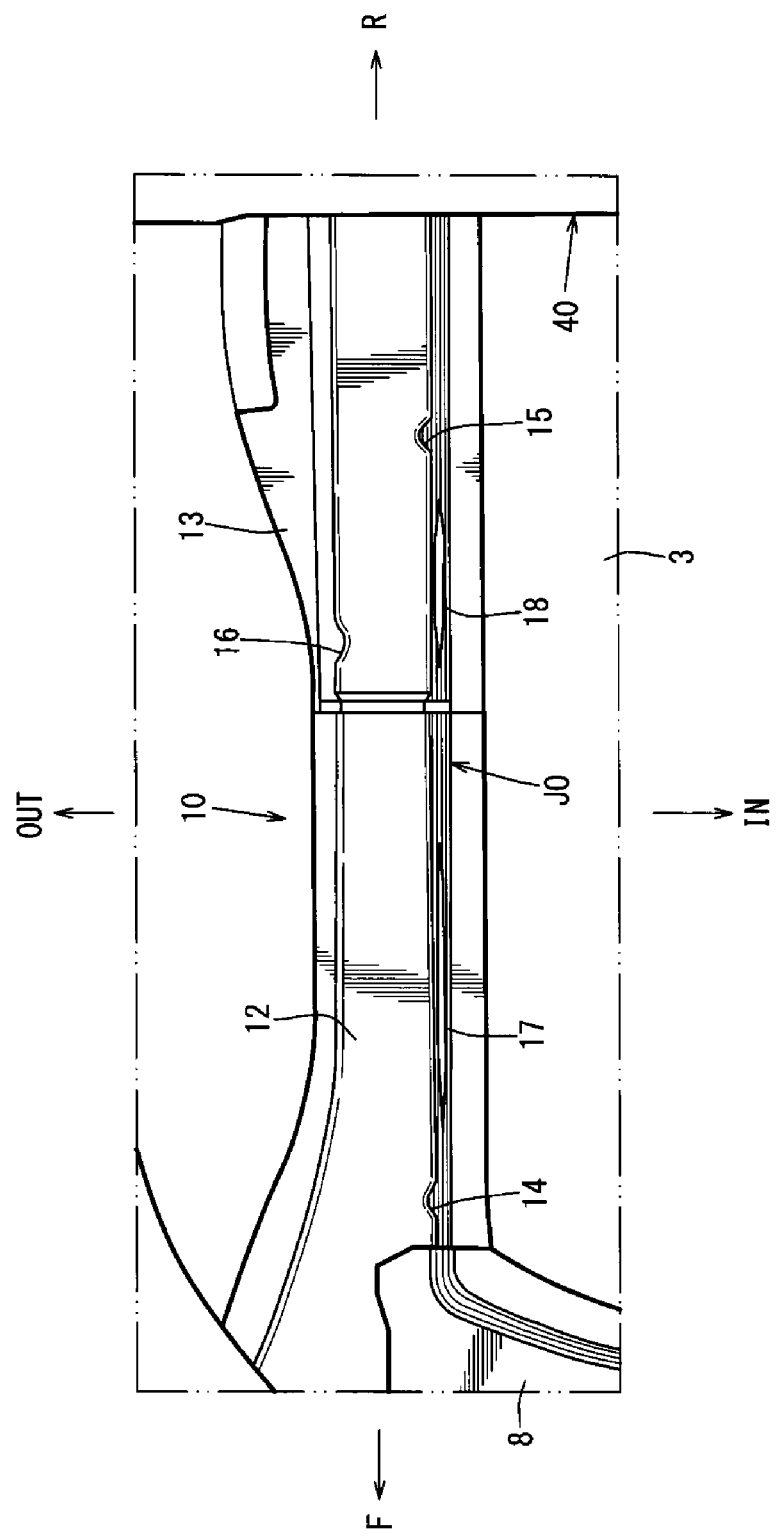
FIG. 8 is a schematic bottom view of the rear vehicle-body structure showing a stage prior to a vehicle rear collision.
Figure 9:
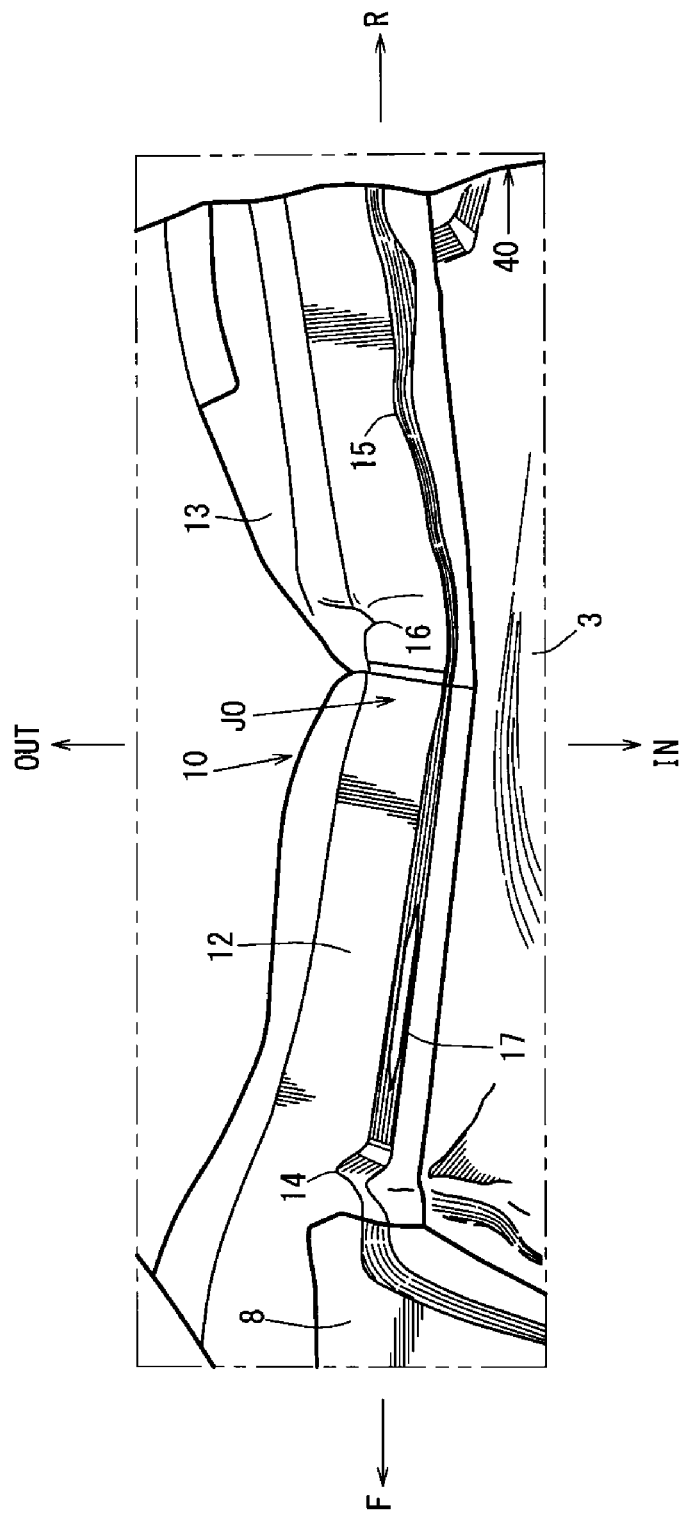
FIG. 9 is a schematic bottom view of the rear vehicle-body structure showing an initial stage of the vehicle rear collision.
Figure 10:
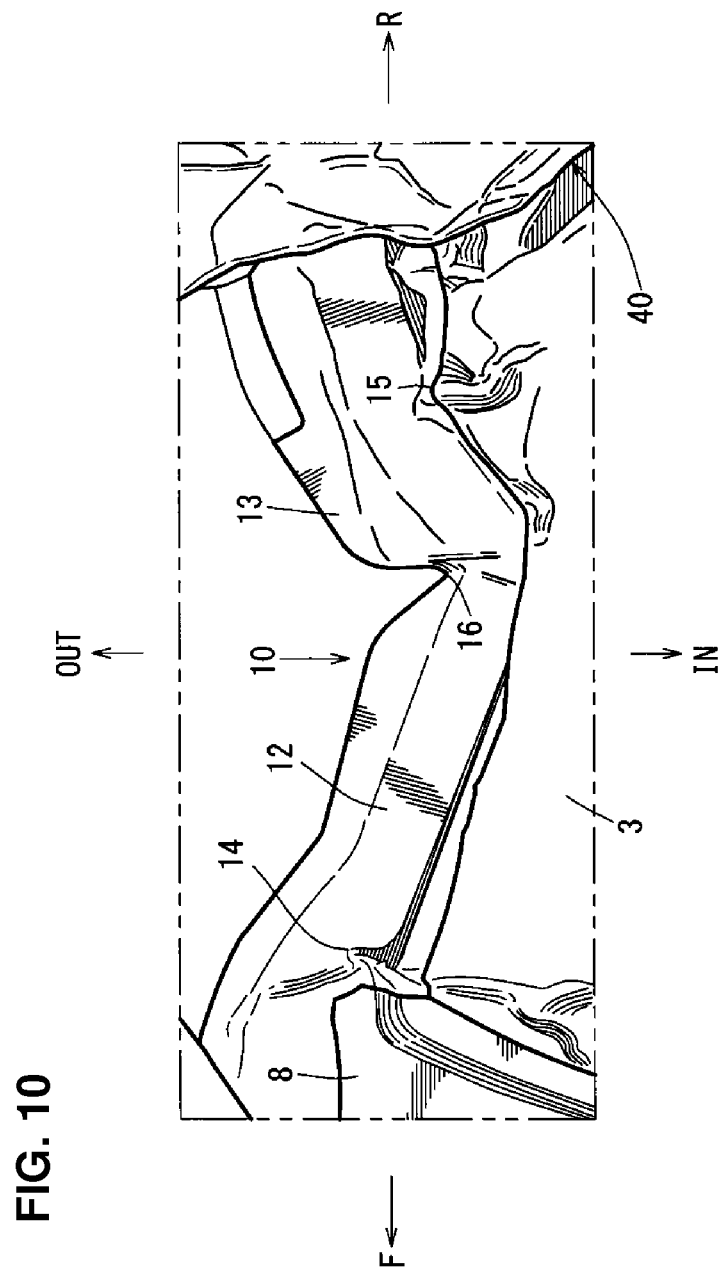
FIG. 10 is a schematic bottom view of the rear vehicle-body structure showing an intermediate stage of the vehicle rear collision.
Figure 11:
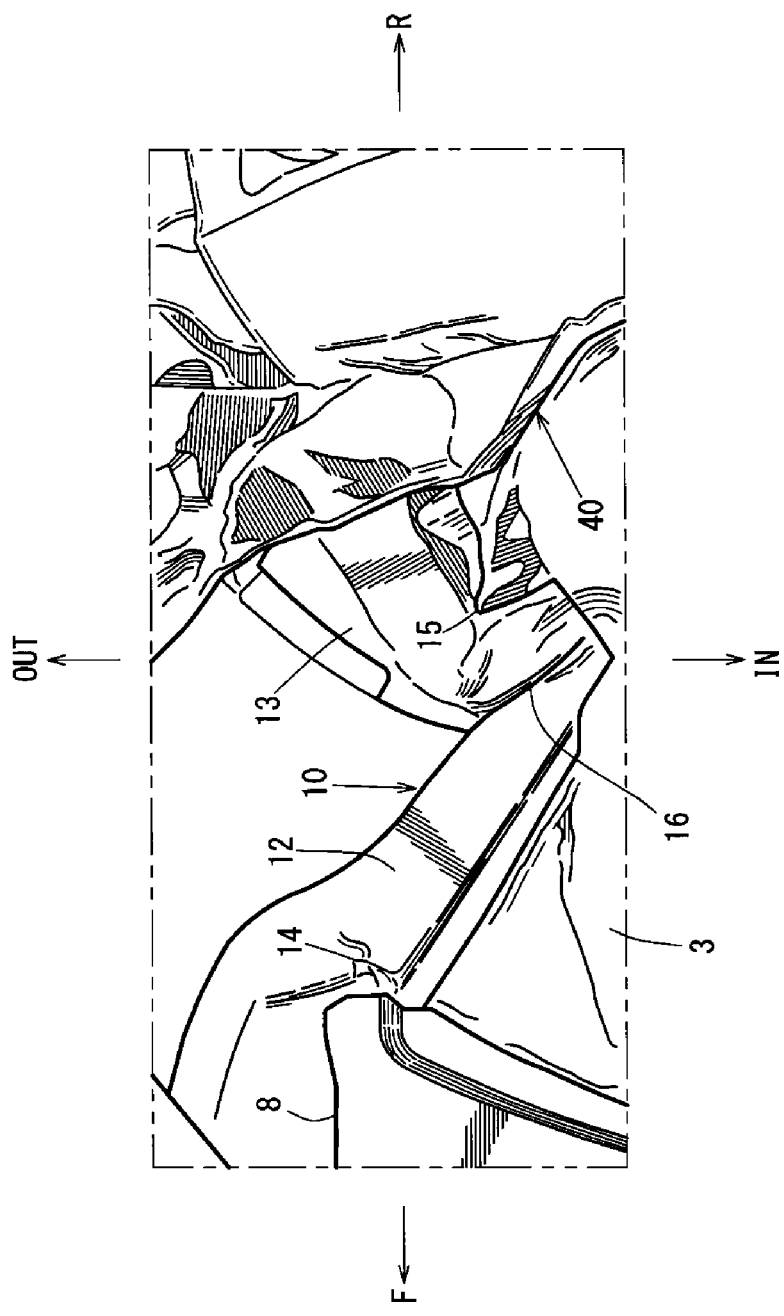
FIG. 11 is a schematic bottom view of the rear vehicle-body structure showing a last stage of the vehicle rear collision.

FIG. 8 is a schematic bottom view of the rear vehicle-body structure showing a stage prior to the vehicle rear collision, FIG. 9 is a schematic bottom view of the rear vehicle-body structure showing an initial stage of the vehicle rear collision, FIG. 10 is a schematic bottom view of the rear vehicle-body structure showing an intermediate stage of the vehicle rear collision, and FIG. 11 is a schematic bottom view of the rear vehicle-body structure showing a last stage of the vehicle rear collision.

When the vehicle rear collision occurs, as shown in FIG. 9 from a usual state shown in FIG. 8, after the crash can 44 has crushed, the rear member 13 as the member for load absorption deformation positioned at the rear portion of the rear side frame 10 starts deforming from the rear, thereby absorbing the collision load, and also the middle part of the rear side frame 10 where the middle bending promotion portion 16 is formed is bent (folded) inward, in the vehicle width direction, with the support point at the front bending-promotion portion 14, thereby generating load absorption deformation of the rear floor panel 3.

According to progress of the vehicle rear collision, as shown in FIG. 10 from a state shown in FIG. 9, the middle part of the rear side frame 10 where the middle bending promotion portion 16 is formed is further bent (folded) inward, in the vehicle width direction, with the support point at the front bending-promotion portion 14, so that the load absorption deformation of the rear floor panel 3 is further progressed. Herein, since the pair of right-and-left rear side frames 10, 20 are interconnected at their rear ends, the rear-end side of the rear side frame 10 is bent (folded) inward, in the vehicle width direction, with a support point at the rear bending-promotion portion 15 positioned at the rear part of the rear side frame 10.

According to further progress of the vehicle rear collision, as shown in FIG. 11 from a state shown in FIG. 10, the middle part of the rear side frame 10 where the middle bending promotion portion 16 is formed is further greatly bent (folded) inward, in the vehicle width direction, with the support point at the front bending-promotion portion 14, so that the load absorption deformation of the rear floor panel 3 is generated further greatly and also the rear-end side of the rear side frame 10 is greatly bent (folded) inward, in the vehicle width direction, with the support point at the rear bending-promotion portion 15.

As described above, the rear vehicle-body structure of the automotive vehicle of the present embodiment comprises the rear floor panel 3, and the pair of right-and-left rear side frames 10, 20 extending in the vehicle longitudinal direction and connected to the both side portions, in the vehicle width direction, of the rear floor panel 3, wherein the rear side frame 10, 20 comprise the front bending-promotion portions 14, 24, the middle bending-promotion portions 16, 26, and the rear bending-promotion portions 15, 25 which cause the rear side frames 10, 20 to bend inward, in the vehicle width direction, in the trough-folding shape in the rear collision of the vehicle, and the longitudinal distance L2 between the front bending-promotion portions 14, 24 and the middle bending-promotion portions 16, 26 is set to be longer than that L1 between the middle bending-promotion portions 16, 26 and the rear bending-promotion portions 15, 25 (L2>L1) (see FIGS. 2 and 5).

According to the present structure, since there are provided three points of bending-promotion portions 14, 15, 16, 24, 25, 26 to cause the rear side frames 10, 20 to bend inward, in the vehicle width direction, in the trough-folding shape and the longitudinal distance L2 between the front and middle bending-promotion portions 14, 24, 16, 26 is set to be longer than that L1 between the middle and rear bending-promotion portions 16, 26, 15, 25, when the vehicle rear collision occurs, the rear part of the rear side frames 10, 20 can be compactly bent (folded) from the rear, thereby generating the load absorption deformation of the rear side frames 10, 20, and the middle part of the rear side frames 10, 20 can be greatly bent (folded) inward, in the vehicle width direction, with the support point at the front bending-promotion portions 14, 24, thereby generating the load absorption deformation of the rear floor panel 3. Thereby, even if the rear side frames 10, 20 are made from the material which may not cause smooth bucking of the rear side frames 10, 20 (such as high-tensile steel plate, FRP, or magnesium alloy), the collision load can be properly absorbed at the vehicle-body rear portion.

Further, in the present embodiment of the invention, the rear side frames 10, 20 are formed by pattern-drawing press in the U shape so as to have the right-and-left side walls a, b and the bottom wall e, the reinforcing beads 17, 18, 27, 28 extending in the axial direction of the rear side frames 10, 20 are formed at the respective intermediate parts of the rear side frames 10, 20 between the above-described front and middle bending-promotion portions 14, 24, 16, 26 and between the above-described middle and rear bending-promotion portions 16, 26, 15, 25, and each of the reinforcing beads 17, 18, 27, 28 comprises the upper vertical wall g positioned outside the base face f of the side wall a of the rear side frames 10, 20, the lateral wall h extending toward the inside of the rear side frames 10, 20 from the lower end of the upper vertical wall g, and the lower vertical wall i extending downward from the inside end of the lateral wall h and positioned inside the base face f of the side wall a of the rear side frames 10, 20, whereby the reinforcing beads 17, 18, 27, 28 are configured in the roughly S shape in the cross section perpendicular to the axial direction of the rear side frames 10, 20 (see FIG. 7).

According to the present structure, since the above-described roughly S-shaped reinforcing beads 17, 18, 27, 28 are used, smooth drawing of a press die for forming the reinforcing beads 17, 18, 27, 28 can be ensured and the rigidity of the rear side frames 10, 20 can be improved by an increase of the ridgelines X2, X3. Accordingly, even if the rear side frames 10, 20 are made from the material which may not have excellent formability, any bending deformation of the rear side frames 10, 20 at another point than the above-described bending-promotion portions can be prevented properly.

Further in the present embodiment of the invention, the rear side frames 10, 20 are formed by the members for load absorption deformation (see the rear members 13, 23) provided at the vehicle rear-end side and the members for fixation (the rear members 13, 23) provided at the vehicle central side which are connected to each other, and the reinforcing beads 18, 28 are respectively provided at least one side wall a, in the vehicle width direction, of the portions of the members for load absorption deformation (the rear members 13, 23) which are positioned near the connection parts thereof (see the joint portions JO), the reinforcing beads 18, 28 respectively having the taper-shaped tips (see FIGS. 2, 5 and 6).

According to the present instruction, since the reinforcing beads 18, 28 respectively have the taper-shaped tips, stress concentration on the rigidity changing point where the members for load absorption deformation (the rear members 13, 23) and the members for fixation (the middle members 12, 22) are connected can be properly reduced, so that the bending (folding) mode of the rear side frames 10, 20 can be stabilized properly.

Additionally, in the present embodiment of the invention, the auxiliary device (see the rising portion 32a of the fuel feeding pipe 32, in particular) is provided on the outward side, in the vehicle width direction, of the rear side frame 10, and the middle bending-promotion portion 16 is provided such that the rear side frame 10 bends inward, in the vehicle width direction, at the portion thereof which is poisoned near the auxiliary device (see FIGS. 1, 3 and 4).

According to the present structure, since the rear side frame 10 bends inward, in the vehicle width direction, in the vehicle rear collision and the deformation of the front part of the rear side frame 10 is suppressed, it can be surely prevented that the auxiliary device (the fuel feeding pipe 32) is improperly caught by the bending rear side frame 10.

The member for load absorption deformation of the present invention corresponds to the rear members 13, 23 of the present embodiment. Likewise, the member for fixation corresponds to the middle members 12, 22, the connection portion corresponds to the joint portion JO, and the auxiliary device corresponds to the fuel feeding pipe 32 (the rising portion 32a, in particular). The present invention should not be limited to the above-described embodiment, and any other modifications or improvements may be applied within the scope of a spirit of the present invention.

What is claimed is:

1. A rear vehicle-body structure of an automotive vehicle, comprising
   a rear floor panel; and
   a pair of right-and-left rear side frames extending in a vehicle longitudinal direction and connected to both side portions, in a vehicle width direction, of the rear floor panel,
   wherein said rear side frame comprises a front bending-promotion portion, a middle bending-promotion portion, and a rear bending-promotion portion which cause the rear side frame to bend inward, in the vehicle width direction, in a trough-folding shape in a rear collision of the vehicle, and a longitudinal distance between the front bending-promotion portion and the middle bending-promotion portion is set to be longer than that between the middle bending-promotion portion and the rear bending-promotion portion.

2. The rear vehicle-body structure of the automotive vehicle of claim 1, wherein said rear side frame is formed by pattern-drawing press in a U shape so as to have a pair of right-and-left side walls and a bottom wall, a pair of reinforcing beads extending in an axial direction of the rear side frame are formed at respective intermediate parts of the rear side frame between said front bending-promotion portion and said middle bending-promotion portion and between the middle bending-promotion portion and said rear bending-promotion portion, and each of the pair of reinforcing beads comprises an upper vertical wall positioned outside a base face of the side wall of the rear side frame, a lateral wall extending toward an inside of the rear side frame from a lower end of the upper vertical wall, and a lower vertical wall extending downward from an inside end of the lateral wall and positioned inside the base face of the side wall of the rear side frame, whereby the reinforcing bead is configured in a roughly S shape in a cross section perpendicular to the axial direction of the rear side frame.

3. The rear vehicle-body structure of the automotive vehicle of claim 2, wherein said rear side frame is formed by a member for load absorption deformation provided at a vehicle rear-end side and a member for fixation provided at a vehicle central side which are connected to each other, and said reinforcing bead is provided at least one of side walls, in the vehicle width direction, of a portion of said member for load absorption deformation which is positioned near a connection part thereof, the reinforcing bead having a taper-shaped tip.

4. The rear vehicle-body structure of the automotive vehicle of claim 3, wherein an auxiliary device is provided on an outward side, in the vehicle width direction, of said rear side frame, and said middle bending-promotion portion is provided such that the rear side frame bends inward, in the vehicle width direction, at a portion thereof which is poisoned near said auxiliary device.

5. The rear vehicle-body structure of the automotive vehicle of claim 2, wherein an auxiliary device is provided on an outward side, in the vehicle width direction, of said rear side frame, and said middle bending-promotion portion is provided such that the rear side frame bends inward, in the vehicle width direction, at a portion thereof which is poisoned near said auxiliary device.

6. The rear vehicle-body structure of the automotive vehicle of claim 1, wherein an auxiliary device is provided on an outward side, in the vehicle width direction, of said rear side frame, and said middle bending-promotion portion is provided such that the rear side frame bends inward, in the vehicle width direction, at a portion thereof which is poisoned near said auxiliary device.

* * * * *